United States Patent [19]

Maurer

[11] 4,006,655
[45] Feb. 8, 1977

[54] DEVICE FOR PROTECTING TOOLS AND WORKPIECES FROM DAMAGE ON A HYDRAULICALLY OR PNEUMATICALLY OPERATED STAMPING PRESS

[75] Inventor: Martin Maurer, Romanshorn, Switzerland

[73] Assignee: Hydrel A.G., Romanshorn, Switzerland

[22] Filed: Mar. 17, 1976

[21] Appl. No.: 667,840

[30] Foreign Application Priority Data

Mar. 17, 1975 Switzerland .................... 3377/75

[52] U.S. Cl. ................................. 83/63; 83/368; 408/6; 408/7

[51] Int. Cl.² ..................... B26D 7/24; B26D 5/20

[58] Field of Search ............ 83/63, 66, 368; 408/7, 408/6

[56] References Cited

UNITED STATES PATENTS 3,513,736   5/1970   Thorman .................... 83/63 X

*Primary Examiner*—Willie G. Abercrombie
*Attorney, Agent, or Firm*—Edwin E. Greigg

[57] ABSTRACT

A device for precluding improper operation of a stamping press including a control cylinder the piston of which is impinged on one side by a pressure medium and on the other side by a pressure medium having a variable constant pressure. Electrical switch elements are utilized to prevent the stamping operation from progressing unless preset conditions exist.

4 Claims, 1 Drawing Figure

U.S. Patent     Feb. 8, 1977     4,006,655
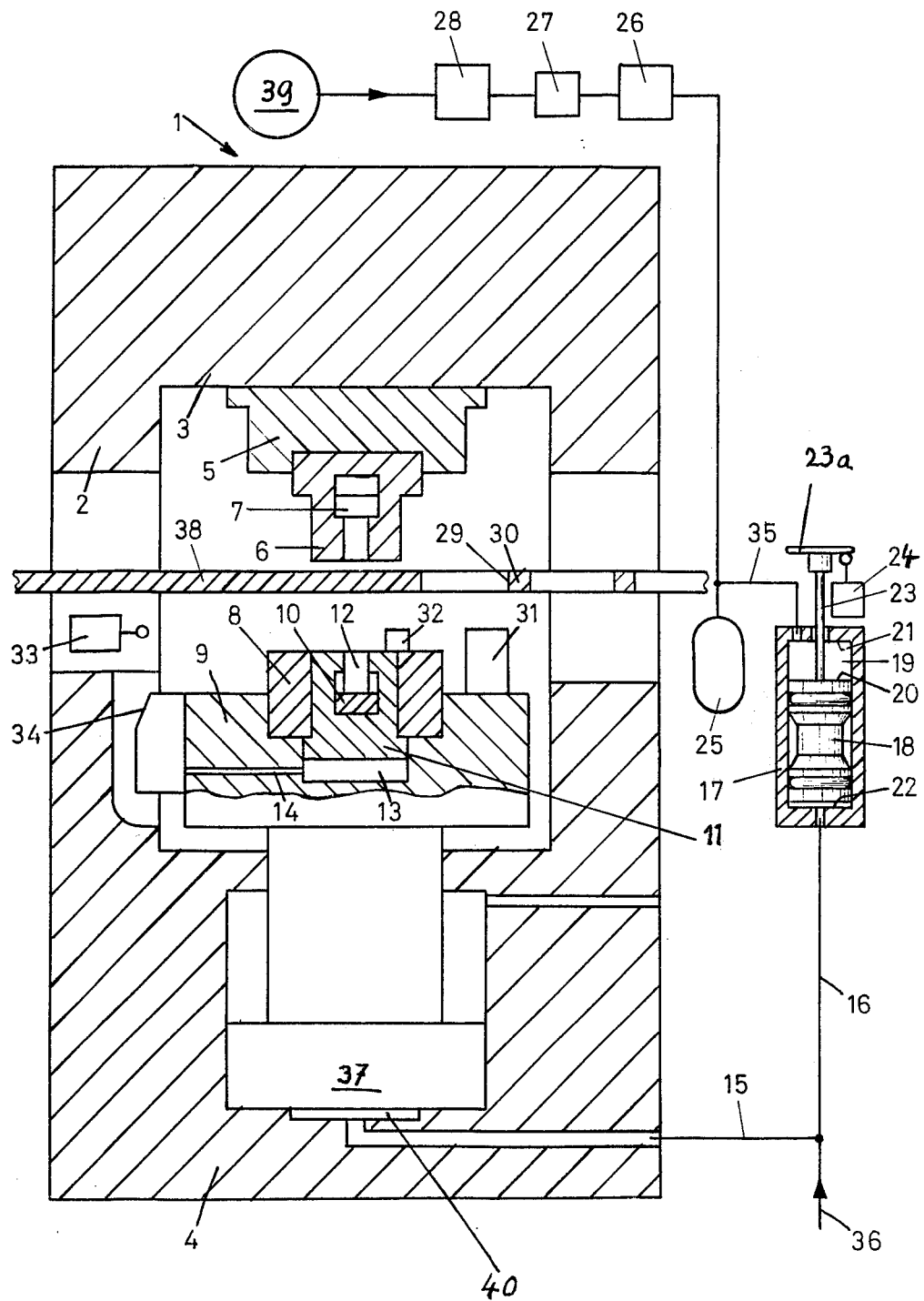

DEVICE FOR PROTECTING TOOLS AND WORKPIECES FROM DAMAGE ON A HYDRAULICALLY OR PNEUMATICALLY OPERATED STAMPING PRESS

BACKGROUND OF THE INVENTION

The present invention relates to a device for protecting tools and workpieces from damage on a hydraulically or pneumatically operated stamping press and comprises an upper rigid pressing table supporting a cutting tool and a cooperating lower movable pressing table, and further includes a movable control element which responds either when the cutting tool contacts the material of the workpiece to be stamped or when a solid foreign body is situated between the material and a cutting tool. The device is further characterized in that the lower pressing table is so disposed in driving connection with a first switch and the movable control element with a second switch that the lower pressing table is arrested in its movement if the second switch is operated before the first switch.

Devices of this type are disclosed, for example, in Swiss Pat. No. 454,577 and German Utility Model No. 6,917,177. In the case of these known devices, one of the two pressing tables is formed in two parts in the stamping direction and is limitedly displaceable; the part supporting the cutting tools being kept apart from the other part by mechanical or pneumatic spring elements or by a hydraulic cushion until a force exceeding its own weight acts thereupon. In the latter case, the table part supported in the above-described manner, forms the movable element. Devices of this type have proved efficient in operation. However, they are subject to the disadvantage that the two-part configuration of the pressing table results in very high production costs. In addition, it is not possible to subsequently add such a device to an existing press without considerable expenditure.

OBJECT AND SUMMARY OF THE INVENTION

The object of the present invention is to so construct a device of the type initially described that its production costs can be substantially lowered and also so that it can be subsequently added to an existing stamping press.

The device according to the invention is characterized in that the movable control element is mounted in a housing disposed adjacent to the pressing table, said movable control element being so arranged that it is influenced on one side by a pressure medium, which operates the pressing piston, and on the other side by a second pressure medium having a variable constant pressure.

The movable control element is situated in a housing which forms a separate cylinder containing a piston which is associated with the movable control element, with the piston being disposed in driving connection with the second switch by means of a piston rod.

Other objects and advantages of the present invention will be more readily apparent from a further consideration of the following detailed description of the drawing illustrating a preferred embodiment of the invention, in which:

BRIEF DESCRIPTION OF THE DRAWING

The single figure of the drawing shows a longitudinal sectional view through a stamping press equipped with an embodiment of the device according to the invention.

DESCRIPTION OF THE PREFERRED EMBODIMENT

A press frame comprising spaced uprights 2, an upper intermediate crown 3 and a lower cylinder yoke 4 forms the force connection arrangement of the press. The cutting die 6 comprises a movable ejector 7 and is rigidly connected to the upper crown 3 by means of the pressing table 5 associated with the crown 3. The matrix 8, which is complementary to the cutting die 6, is mounted on the movable pressing table 9. It comprises an ejecting piston 11 which is hydraulically influenced by pressure fluid, which flows through the line 14 into the chamber 13. A bridge 10 supports the die 12 in the matrix 8. The movable pressing table 9 is rigidly connected to the hydraulic piston 37, the latter being supplied with pressure fluid through the conduits 15 and 36 while conduit 16 extending therefrom leads to a control cylinder 17. The piston 18 within the cylinder 17 is connected to a piston rod 23 that extends through an end wall of the cylinder and cooperates with a switch 24, the function of which will be described later. The cylinder 17 comprises two longitudinally disposed upper and lower abutment faces 21 and 22, respectively. The piston face 20 and the cylinder face 21 limit the displacement chamber 19 of the control cylinder 17. This chamber is connected to an air container 25 which is supplied from a compressed air source 39 via a filter 28, regulating valve 27, and lubricator 26. When the piston 18 is in contact with the lower cylinder face 22, the stop 23a associated with the piston rod 23 actuates the switch 24.

A control pin 31 is mounted adjacent to the matrix 8 on the movable pressing table 9, as shown. The opposite end of the movable table 9 is arranged to have a chamfered portion 34 that functions as a camming means. Thus on upward movement of the table 9, the camming means 34 can operate the switch 33, if desirable.

The device operates in the following manner: at the beginning of the stamping process, the chamber 19 of the control cylinder 17 is acted on by compressed air via the line 35. The pressure of this compressed air is greater than the pressure in the lines 16 and 15 which is required to raise the main piston 37 and the pressing table 9. As a result, the pressure fluid supplied via the line 36 firstly only flows through the line 15 into the chamber 40 provided adjacent to the main piston 37 and lifts the latter. The camming means 34 is adjusted so that it triggers the limiting switch 33 shortly before the matrix 8 contacts the strip 38 to be stamped. When the strip 38 is clamped between the die 6 and the matrix 8 the pressure in the lines 15 and 36 is then raised. As a result, the pressure fluid also flows through the line 16 into the control cylinder 17 and the piston 18 is thus moved against the stop 21. Accordingly stop means 23a carried by the piston rod 23 is removed out of contact with the limiting switch 24 and the compressed air in the air container 25 is compressed slightly.

If it should happen that a foreign body such as shown at 32 is disposed between the matrix 8 and the strip 38, the pressure in the line 36 is raised sooner, thus producing a longitudinal movement of the piston 18 before the limiting switch 33 has been actuated. The electrical control system is so designed that if the switch 24 is not actuated before the switch 33, the press opens without having stamped a workpiece.

The control pin 31 projects beyond the matrix face in such a manner that in the event of a full advancement stroke the pin will clear the punched out opening 29 in the metal strip 38 and project therethrough. However, if the advancement stroke of the strip 38 is not long enough, the web 30 adjacent to the punched out portion is then disposed above the control pin 31 and this acts as an obstacle between the matrix 8 and the strip 38 and operation is stopped.

Instead of a movable piston such as that illustrated being disposed in the housing 17, a housing containing for example, a diaphragm, could be otherwise provided; the diaphragm being influenced on one side by the pressure fluid and on the other side by the compressed air from the compressed air source 39.

What is claimed is:

1. A device for protecting tools and workpieces from damage on a hydraulically or pneumatically operated stamping press, comprising a rigid pressing table bearing the cutting tools and a movable pressing table, and a movable element which responds either when cutting tools contact the workpiece to be stamped or when a hard foreign body is disposed between the workpiece and one of the cutting tools; the movable pressing table being disposed in drive connection with a first switch and the movable element with a second switch such that the movable pressing table is arrested when the second switch is actuated before the first switch, characterized in that the movable control element (18) is disposed in a housing (17) disposed external to the two pressing tables (5,9); one side of the housing (17) being impinged by the pressure medium which operates the piston (38) and the other side being impinged by a second pressure medium having a variable constant pressure.

2. A device as claimed in claim 1, characterized in that the housing is in the form of a separate cylinder (17) containing as the movable control element a piston (18) which is disposed in drive connection with the second switch (24) via a piston rod (23).

3. A device as claimed in claim 2, characterized in that the second pressure medium is compressed air which is supplied to the cylinder (17) via a regulating valve (27).

4. A device as claimed in claim 1, characterized in that the pressing table (9) further includes an upwardly projecting pin (31) arranged to cooperate with the travel of the strip (38) and interrupt press operation upon an inadequate length of said strip attaining a predetermined position beneath the cutting die (6).

* * * * *